(12) United States Patent
Glance et al.

(10) Patent No.: US 6,321,179 B1
(45) Date of Patent: Nov. 20, 2001

(54) SYSTEM AND METHOD FOR USING NOISY COLLABORATIVE FILTERING TO RANK AND PRESENT ITEMS

(75) Inventors: Natalie S. Glance, Meylan; Manfred Dardenne, Grenoble, both of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/343,118

(22) Filed: Jun. 29, 1999

(51) Int. Cl.[7] ............................. G06F 15/00; H03F 1/26; H04B 15/00
(52) U.S. Cl. ............................................. 702/189; 705/10
(58) Field of Search .............................. 702/81–84, 108, 702/122, 123, 179, 181, 182, 183, 188, 190, 193, 196, 197; 709/223, 224, 225; 708/300, 301, 303, 432; 705/2, 7, 14, 10, 26

(56) References Cited

U.S. PATENT DOCUMENTS

| | | |
|---|---|---|
| 4,996,642 | 2/1991 | Hey . |
| 5,704,017 | 12/1997 | Heckerman et al. . |
| 5,724,567 | 3/1998 | Rose et al. . |
| 5,790,426 * | 8/1998 | Robinson .............................. 702/179 |
| 5,794,237 | 8/1998 | Gore, Jr. . |
| 5,799,318 | 8/1998 | Cardinal et al. . |
| 5,884,282 * | 3/1999 | Robinson ................................. 705/27 |
| 6,041,311 * | 3/2000 | Chislenko et al. ....................... 705/27 |
| 6,049,777 * | 4/2000 | Sheena et al. ........................... 705/10 |
| 6,064,980 * | 5/2000 | Jacobi et al. ............................ 705/26 |
| 6,078,740 * | 6/2000 | DeTreville ............................... 703/22 |
| 6,092,049 * | 7/2000 | Chislenko et al. ...................... 705/10 |
| 6,112,186 * | 8/2000 | Bergh et al. ............................. 705/10 |
| 6,236,975 * | 5/2001 | Boe et al. ................................. 705/7 |
| 6,236,977 * | 5/2001 | Verba et al. ............................. 705/10 |

OTHER PUBLICATIONS

Natalie Glance, Damian Arregui and Manfred Dardenne, Knowledge Pump: Supporting the Flow and Use of Knowledge, 1998, pp. 35 through 51.

* cited by examiner

Primary Examiner—Marc S. Hoff
Assistant Examiner—Demetrius Pretlow
(74) Attorney, Agent, or Firm—Jeannette M. Walder

(57) ABSTRACT

A system and method of providing predicted user ratings includes calculating the accuracy of predictions based on the variance of distribution of the predicted user's rating. The system and method present and rank the results by treating the variance as a source of noise. The decision to present or not to present an item is made by sampling the probability distribution of the predicted rating and comparing the result to some user-set threshold (e.g., "show me all results that the system predicts I will score 3 or higher") or a system default value.

23 Claims, 2 Drawing Sheets

SYSTEM AND METHOD FOR USING NOISY COLLABORATIVE FILTERING TO RANK AND PRESENT ITEMS

FIELD OF THE INVENTION

This invention relates generally to collaborative filtering systems for predicting a user's level of interest in information, and more particularly to a collaborative filtering system that provides users with an estimate of the accuracy of its predictions.

BACKGROUND OF THE INVENTION

The amount of information that is available globally, via the World Wide Web or the Internet, or locally on some Intranets, is so large that managing such information is critical. One way of managing and distributing information is to use a collaborative filtering system to predict a user's preference and use that information to distribute new information to the user.

Collaborative filtering, the sharing of knowledge through recommendations, is an important vehicle for distributing information. There are two distinct types of collaborative filtering mechanisms: those which enable active collaborative filtering by making it easier for people to share pointers to interesting documents and those which automate collaborative filtering by using statistical algorithms to make recommendations based on correlations between personal preferences. Collaborative filtering is used in many recommender systems, i.e., systems which provide recommendations to users.

Automated collaborative filtering (ACF) is a general type of statistical algorithm that matches items (such as movies, books, music, news articles, etc.) to users by first matching users to each other. ACF uses statistical algorithms to make recommendations based on correlations between personal preferences. Recommendations usually consist of numerical ratings input manually by users, but can also be deduced from user behavior (e.g., time spent reading a document, actions such as printing, saving or deleting a document). The premise of such systems is that a user is going to prefer an item that is similar to other items chosen by the user and by other users.

U.S. Pat. No. 5,724,567 to Rose et al. entitled "System for Directing Relevance Ranked Data Objects to Computer Users" describes a system for matching a user's interests by comparing the content of an item with a user's adaptive profile. Feedback is also available to enable the user to update his/her profile.

U.S. Pat. No. 5,704,017 to Heckerman et al. entitled "Collaborative Filtering Utilizing a Belief Network" describes a collaborative filtering system which employs a belief network to predict the preferences of a user using probabilistic inference. In performing probabilistic inference, the known attributes of a user are received and the belief network is accessed to determine the probability of the unknown preferences of the user given the known attributes. Based on these probabilities, the preference most likely to be desired by the user can be predicted.

Collaborative filtering systems are of particular value to suppliers of goods and services in that they can be used to enhance the distribution of their goods and services to customers. Current applications of ACF technology in electronic commerce include recommendation services given away freely by retailers to attract customers to their offerings and to provide more specialized services and knowledge management tools for organizations. For both kinds of applications, the quality of the recommendation service is important.

Automated collaborative filtering systems such as the above suffer from the cold-start problem: early users will receive inaccurate predictions until there is enough usage data for the algorithm to be able to learn their preferences. In applications of ACF technology, such as knowledge management tools for organizations, consistent high quality service is key. Many existing current systems which employ ACF (MovieLens, Arnazon.com, BarnesandNoble, etc.) either require users to rate a number of items before they will provide recommendations, use data from purchases, or provide initial predictions which are not personalized (e.g., use the average rating).

Even once a collaborative filtering system has learned something about a user, the statistical significance and accuracy of predictions made using ACF (whether using a correlation calculation or a probabilistic inference) for any given item varies widely. For example, it may vary depending on how many others have rated the item. It may also depend on the number of items rated in common by the users. From the user's perspective, feedback about the accuracy of the predictions can help them build up confidence in the system and better understand the significance of the predictions and how the prediction mechanism works.

Making predictions based on a large number of ratings or a large number of ratings by other users will generally increase the accuracy of the prediction, but can take significant processing time. Some users may want to have the option of specifying the accuracy criteria in order to save processing time. These users may not be willing to wait for more accurate predictions and are less likely to be tolerant of errors, knowing that they trade off accuracy for timeliness. Other users, who tend to act as information filters, or gatekeepers, may be more tolerant of errors in predictions. However, for a given domain of interest, there will be a group of users who prefer to wait for accurate, personalized predictions.

There is a need for a collaborative filtering system that provides users with an estimate of the accuracy of its predictions. There is a need for a system and method of providing predictions to users in which the users can select or filter the accuracy of the prediction in exchange for timeliness. There is a need for a collaborative filtering system and method that provides users with high quality recommendations. There is a need for a collaborative filtering system which can accommodate different levels of accuracy for different users.

SUMMARY OF THE INVENTION

A collaborative filtering system for predicting a user's rating for an item, according to the invention, includes a memory storing a set of correlation coefficients, where each correlation coefficient is a measure of similarity in ratings between pairs of users in the system who have rated a particular item, and ratings for the item made by other users in the system. A processor, responsive to a request for a predicted user's rating for an item, calculates the predicted user's rating. The predicted user's rating is the sum of the product of a rating and its respective correlation coefficient divided by the sum of the correlation coefficients. The processor also calculates the variance of the predicted user's rating, where the variance of the predicted user's rating is a function of the variance of the correlation coefficients and the variance of the ratings. The variance of the predicted user's rating gives the user a range of the accuracy of the prediction.

The collaborative filtering system according to the invention can be implemented in one of many ways. For example, the system can be implemented in software operated by a network server. Users may access the server through a remote work station and input their requests. The server may be part of an Intranet or Internet network. Users may also provide ratings to the system which are stored in memory and may be used to update the correlation coefficients, as well as the variance calculations. (In the inventors' copending application Ser. No. 09/342,862, the variance may be stored and also used for updating the correlation coefficients.) The system can also be implemented as a software program on a personal computer.

Specific relationships for calculating the predicted user's rating are provided, as well as specific relationships for calculating the variance of the predicted user's rating. Information concerning the accuracy (in the form of the variance) can then be provided to users to help them judge the predicted user's rating. This information can also be used to filter which items are presented to the user based on accuracy. Users can tune the system to present only items that satisfy a criterion of accuracy. For example, the system can be programmed to provide the predicted user's rating when the predicted user's rating calculation exceeds a predetermined threshold value and provide the variance as a range about the predicted user's rating.

If more than one item is requested for rating, the items can be ranked and presented in accordance with their respective predicted user's rating and variance. The predetermined threshold value can be set by the system or by each user. In this way, if the user sets his/her own threshold, he/she can determine the amount of accuracy (and processing time required) to use in providing the predicted user's rating.

The system can be used to rank and present items to the user by estimating the distribution of the prediction rating as a normal distribution with expected value given by the calculated predicted user's rating and variance by the calculated variance of the predicted user's rating. Alternatively, the system can rank and present items to the user by estimating the distribution of the prediction rating from empirically determined usage data and using the observed distribution with expected value given by the calculated predicted user's rating and variance by the calculated variance of the predicted user's rating.

The system can also rank and present items to the user by treating the variance of the predicted user's rating as noise. By treating the variance as a source of noise, the distribution of the user's actual (future) score can be described as a function of the predicted rating and its variance. The distribution can be used to decide whether or not to present an item to the user and how to rank it compared with other items. This is accomplished by sampling the probability distribution of the predicted user's rating and presenting the predicted user's rating when the sampled value is greater than a user set threshold value. By enabling the user to set his/her own threshold, the user is able to tune or refine the amount of background noise (variance) desired, trading off between timeliness (high noise) and level of personalization (low-noise).

A method according to the invention includes calculating the accuracy of predictions based on the variance of the distribution of the predicted user's rating. A method according to the invention presents and ranks the results by treating the variance as a source of noise. The decision to present or not to present an item is made by sampling the probability distribution of the predicted rating and comparing the result to some user-set threshold (e.g., "show me all results that the system predicts I will score 3 or higher") or a system default value. Those items chosen to be presented may be ranked in reverse order to the probability that they satisfy a general system-wide criteria for acceptability (e.g. probability that predicted rating qualifies as good or better). Items with the highest probability for satisfying acceptability are shown first; items with the lowest probability are shown last.

DETAILED DESCRIPTION OF THE PREFERRED EMBODIMENT

Figure 1:
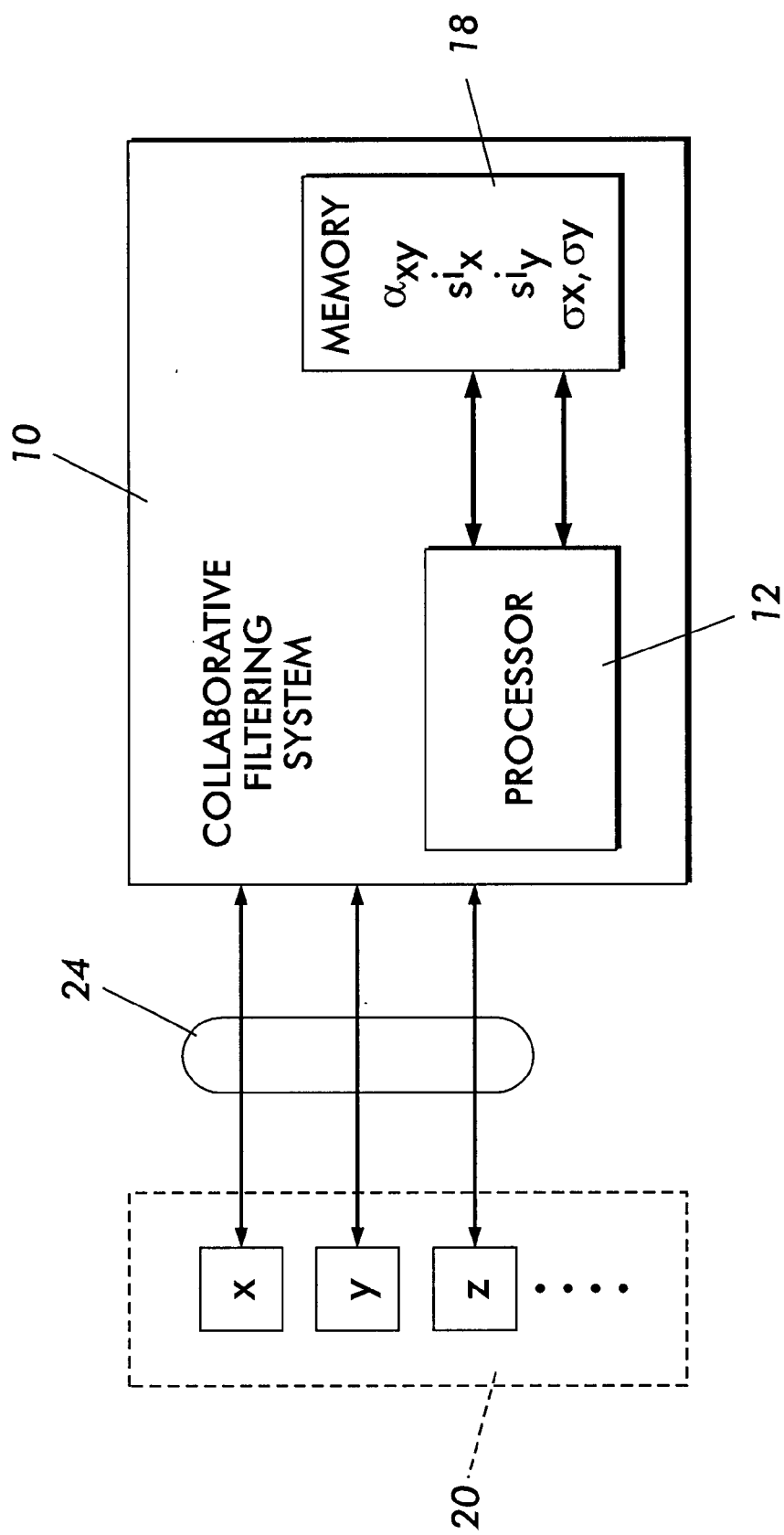
FIG. 1 is a block diagram of a collaborative filtering system according to the invention.

Referring now to the drawings, and in particular to FIG. 1, a collaborative filtering system according to the invention is generally shown therein and indicated by reference numeral 10. ACF system 10 includes processor 12 and memory 18. Correlation coefficients $\alpha_{xy}$ and ratings ($S^i_x$, $S^i_y$) provided by the various users and others, and variance calculations ($\sigma_x$, $\sigma_y$) are stored in memory 18. When the system first starts up, the $\alpha_{xy}(0)$ for cold-starting the system may be provided in any preferred manner. Initial ratings may also be provided. For example, in the inventors' co-pending application Ser. No. 09/342,862, entitled "System and Method for Bootstrapping a Collaborative Filtering System," the inventors disclose a system and method for bootstrapping the correlation coefficients $\alpha_{xy}(0)$ by using organizational data such as the formal organization chart supplemented by user input that reveals informal links between users.

The processor 12 performs various calculations described below: predicted user rating, variance and probability distribution of the prediction. A group of users 20 may request and receive recommendations from, and provide ratings to, system 10 via interface 24. Interface 24 may be via an Intranet or the Internet. System 10 may be located on a remote server, a local computer or implemented entirely in software.

Prediction Method

User to user correlations are an essential part of an ACF system. A standard approach to ACF is to use the Pearson r Algorithm to calculate user-user correlations (correlation coefficients) from ratings data that has been provided by the users. These correlation coefficients are then used to predict a user's score for an item as a correlation-weighted average of all the ratings for the item. The standard Pearson r correlation coefficient used to measure the similarity between users from items they have both rated is given by the relationship:

$$r = \frac{\sum (S_x - \bar{S}_x)(S_y - \bar{S}_y)}{\sqrt{\sum (S_x - \bar{S}_x)^2} \times \sqrt{\sum (S_y - \bar{S}_y)^2}}, \tag{1}$$

where the sum is over all N items that users X and Y have rated in common, $S_x$ is X's rating for item S and $S_y$ is Y's rating for item S. The coefficient r ranges from −1, which indicates a negative correlation, to 0, which indicates no correlation, to 1 which indicates a positive correlation between both users.

Many systems employing ACF tend to use a variation of this coefficient called the Constrained Pearson r Algorithm, which takes into account variations of ratings about a fixed point (usually the midpoint of the range). For example, if ratings range from 0 to 5, the constrained Pearson r coefficient could take into account variations around 2.5. Thus the relationship for determining the correlation coefficient $\alpha_{xy}$ between user X and user Y about a fixed point $P_0$ is given by:

$$\alpha_{xy} = \frac{\sum (S_x - P_0)(S_y - P_0)}{\sqrt{\sum (S_x - P_0)^2} \times \sqrt{\sum (S_y - P_0)^2}}. \quad (2)$$

For a group of users, sometimes referred to as a community of users, such as in an Intranet setting, a set of values $\{\alpha_{xy}\}$ would be obtained, with separate correlation coefficients for each pair of users (X,Y).

To predict a user X's score for an item i, ACF calculates a weighted average of all the ratings on the particular item provided by other users Y in the system according to the following formula for the prediction, $P^i_x$:

$$P^i_x = P_0 + \frac{\sum_{y \in raters}(S^i_y - P_0)\alpha_{xy}}{\sum_y |\alpha_{xy}|}. \quad (3)$$

Preferably only enumerated values are used for the ratings (e.g., 0,1,2,3,4,5) and $P_0$ is chosen to be a non-integer to ensure that the correlations are always defined (no division by zero).

Once a prediction for item i is obtained, the prediction can be used by a recommender system to make a recommendation to the user X. For example, if $P^i_x$ is less than some threshold $P_1$, such as the average or midpoint of the ratings, the recommender system would likely not recommend item i to user X. If the $P^i_x$ is greater than the threshold of $P_1$, the recommender system would likely recommend the item i to user X. The recommender system may also use the predictions to rank the recommended items shown to the user.

Typically this prediction relationship (3) is modified to take into account only correlations above a certain threshold. In addition, in very large systems (especially those involving a community of users on the Internet) in order to reduce the computational complexity of this relationship, the sum is taken over a neighborhood of the N most highly correlated raters.

Variance Calculation

To provide the user with an indication of the accuracy of the calculated prediction, the variance of the distribution of the prediction is calculated. In prediction relationship (3), the prediction distribution is a function of two variables, $\alpha_{xy}$ and $S^i_y$. To estimate the variance in the distribution of the prediction due to the variance in the distribution of its dependent variables, $\alpha_{xy}$ the correlation coefficients and $S^i_y$, the ratings by other users Y of the same item i, the following formula is applied:

$$\text{Var}(P^i_x) = \sum_y \left(\frac{\partial P^i_x}{\partial \alpha_{xy}}\right)^2 \text{Var}(\alpha_{xy}) + \sum_y \left(\frac{\partial P^i_x}{\partial S^i_y}\right)^2 \text{Var}(S^i_y). \quad (4)$$

This relationship cannot be processed easily or quickly in its present form. Under certain simplifying assumptions, this relationship can be reduced to a more manageable form. It can generally be assumed that when $S_x$ and $S_y$ are uncorrelated and $N_{xy}$ (the number of ratings in common) is large (i.e., typically greater than 20), then $\alpha_{xy}$ is distributed approximately normally with a mean of zero and a standard deviation of $$1/\sqrt{N_{xy}}.$$

Here $N_{xy}$ is the number of items that users X and Y have rated in common. Thus the variance $\alpha_{xy}$ can be estimated as $1/N_{xy}$:

$$\text{Var}(\alpha_{xy}) = \frac{1}{N_{xy}}. \quad (5)$$

The variance in a user Y's distribution of ratings is given by the relationship:

$$\text{Var}(S^i_y) \equiv \sigma^2_y = \frac{\sum_i (S^i_y - \overline{S}_y)^2}{N_y}, \quad (6)$$

where the sum is over all items i rated by user Y and $N_y$ is the number of items that have been rated by Y. To simplify the calculation, it can be further assumed that the variance in users' ratings distribution is roughly the same for all users, even across different collaborative filtering systems (normalized by the range of ratings allowed by the system). This simplifying assumption can be tested against user data, but is generally believed to be true. In this case, $\sigma_y = \sigma$ for all users Y.

Taking the derivative of the expression for $P^i_x$ in relationship (3) and substituting relationships (5) and (6) in relationship (4), we obtain the following expression for the variance in the prediction:

$$\text{Var}(P^i_x) = \frac{\sum_y K^2_y / N_{xy}}{(\sum_y |\alpha_{xy}|)^2} + \frac{\sum_y \sigma^2_{xy} \sigma^2_y}{\sum_y |\alpha_{xy}|^2}, \quad (7)$$

where $K_y = (S^i_y - P_0) - \text{sign}(\alpha_{xy}) \times (P^i_x - P_0)$ and, in the example of enumerated ratings of (0,1,2,3,4,5), is bounded by [15,5].

$\alpha_{xy}^2$

The second term in the above $\text{Var}(P^i_x)$ equation (7) is a sum over terms that look like $\alpha_{xy}^2/(\Sigma|\alpha_{xy}|)^2$. Excluding the situation where $\alpha_{xy}=0$ exactly, since $\alpha_{xy}$ is between –1 and 1 and $N_i$ is the number of ratings for item i, then $\alpha_{xy}^2/(\Sigma|\alpha_{xy}|)^2$ will fall between $1/N_i$ and 1.

The lower limit, $1/N_i$, occurs when all correlation values are the same. This may occur, for example, when the system first starts up and all the correlations are initialized to the same value. In this case, the prediction formula for $P^i_x$ is simply the average over all ratings for the item, and the right-hand term in the variance in the prediction is roughly $\sigma^2/Ni$. That is, the second term of the variance decreases inversely with the number of ratings available for the item. Thus, the second term indicates that the more ratings, the better. The upper limit occurs when one correlation value dominates the others. In this case, the predicted rating is the same as the rating given by the relatively highly correlated individual, and the variance due to the second term is high, $\sigma^2$.

The first term in the variance of the prediction relationship (7) is dominated by two components: the average value of $1/|\alpha_{xy}|^2$ and the average value of $1/N_{xy}$. The average value of the first component becomes smaller when there are strong, i.e., positive or negative, correlations, which are more predictive than smaller magnitude correlations. The average value of the second component decreases each time there is an additional item that both individuals of a pair have rated.

Overall, the first term of this relationship (7) indicates that the prediction is likely (but not certain) to have lower variance if ratings by individuals who have fewer than some threshold of items rated in common with user X and which correlation with user X is less than some threshold are neglected. In other words, if $\alpha_{xy}$ and $N_{xy}$ are small in magnitude, the contribution to the variance due to the first term will decrease if user Y is dropped from the prediction calculation for user X.

There are trade-offs between the two terms of this relationship (7). The second term decreases with the number of overall ratings considered. If the users who contributed the ratings are either poorly correlated with X or have few items noted in common with X, the first term may increase when additional ratings are taken into account. One solution is to adopt the neighborhood approach: in the prediction relationship (3), consider only the neighborhood of M users most highly correlated with user X. However, the variance relationship (7) points to a refinement of the culling criteria: consider only the neighborhood of M users most highly correlated with user X, normalizing by the number of items rated in common (i.e., those users for which the product $\alpha_{xy}N_{xy}$ is greatest).

The variance calculation provides information in addition to the predicted rating, which information can be provided to the user both in explicit and in implicit ways. Implicitly, the collaborative filter can be programmed to indeterministically decide which is of higher interest to a user: an item with a prediction rating of 4.1+/−1.3 or one with a prediction rating of 3.7+/10.5. Explicitly, the collaborative filter can provide the prediction and the variance to the user.

The prediction relationship (3) and variance relationship (7) given above can be used in a collaborative filtering system to rank and present items to the user. A criteria for ranking and presentation can be obtained by estimating the distribution of the prediction rating as a normal distribution with expected value given by the prediction relationship (3) above and variance by the variance relationship (7) above. Since the normal distribution has infinite domain while the rating range is bounded, approximating the distribution may give rise to errors. Specifically, it may introduce a further bias towards high scores. An alternative to using the normal distribution would be to determine the distribution of ratings empirically from usage data and use the observed distribution in the place of the normal distribution in the method described below.

Instead of directly using the predicted score from the prediction relationship (3) for purposes of presentation to the user, in an alternative embodiment the probability of the distribution of the prediction (the user's predicted rating) may be sampled and the variance of the prediction may be treated as a source of noise. For items where the variance is high, there many not be as much difference between an item predicted as 2.5 and an item predicted as 4.0, though the spread seems high at first glance. Treating the variance as a source of noise means that the user still has a chance to see the second item first, albeit less chance than seeing it second, all things being equal.

The collaborative filtering system decides whether or not to present an item for a user, by sampling the probability distribution of the predicted user's rating:

$$P(z) = \frac{1}{\sqrt{2\pi}\sigma} e^{-(z-P_x^i)^2/2\sigma^2}. \quad (8)$$

If the result is greater than a default or a user-chosen threshold, $r_x$, then the item is presented. In the absence of the user-chosen threshold, a default user threshold such as $r_0=2.5$ (from the example enumerated ratings range of 0 to 5) may be used. Additionally, there may be some user or system variable limiting the total number of items to be presented to the user.

In order to rank the items that satisfy the criteria for presentation, for each item, the probability that a user will rate the item as at least "good" is calculated. "Goodness" is defined as depending on the rating scale. For the example scale or range of ratings from 0 to 5, a value of 2.5 or higher is defined as "good." Using the mean field approximation, the mean probability that the predicted score is greater than $r_0$ is given by the probability that the expected prediction score is greater than $r_0$:

$$\rho(P_x^i) = \frac{1}{2}\left\{1 + \text{erf}\left[\frac{P_x^i - r_0}{\sqrt{2}\,\sigma}\right]\right\}. \quad (9)$$

This function is used to rank the items to be presented to the user in inverse order to the mean probability that the item to be presented is expected to be at least "good" or better.

The variance result can also be presented explicitly to the user, in addition to the prediction calculation, in order to allow the user to better interpret the prediction. If users can be helped to understand the meaning of variance, they may be more forgiving of predictions they view as poor when the stated variance is high. Similarly, if users see the system making better predictions as the variance gets smaller, their confidence in ACF should increase.

Variance may be displayed in a number of different ways. For example, it may be displayed as predicted score+/− standard deviation; as an estimated prediction distribution (e.g., a histogram approximation to Equation 8) including both the prediction and the variance; and as a confidence interval, i.e., percent probability that the user's score will lie within a specified range.

Figure 2:
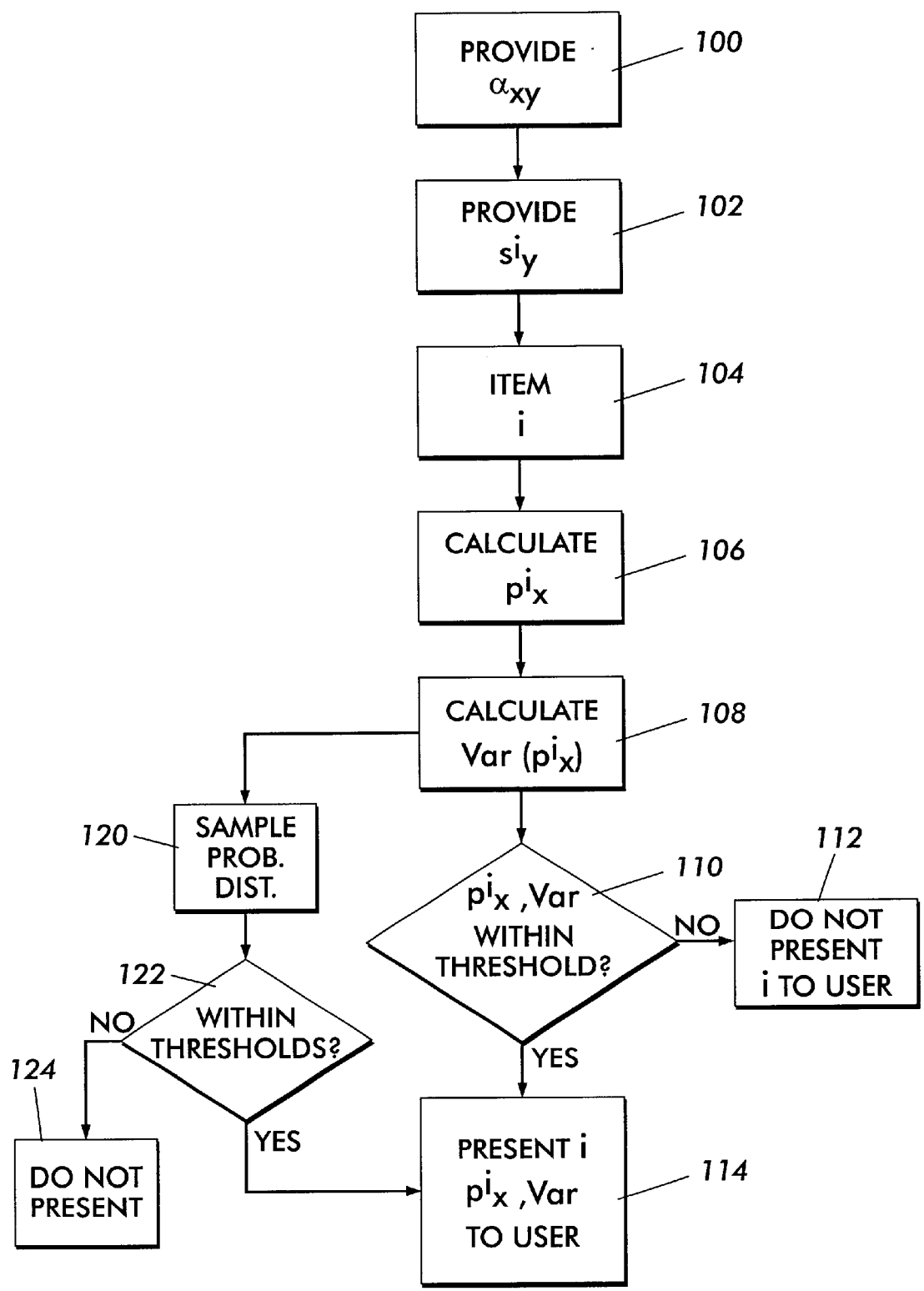
FIG. 2 is a flow chart of a method, according to the invention, of predicting a user's rating of a new item.

Referring to FIG. 2, a flow chart of the steps in making a recommendation using a collaborative filtering system is shown. These steps may be implemented in program code and executed on system 10 (of FIG. 1). In step 101, a set of correlation coefficients $\alpha_{xy}$ is provided for the users in the system. These correlation coefficients can be cold-started using the method described in copending application Ser. No. 09/342,862, and updated in accordance with one of the methods described therein. Alternatively, other methods of cold-starting and updating the coefficients may also be used. In step 102, a set of user ratings (or estimates) for all items rated by users in the system is provided.

In step 104, a new item i is considered for ranking and presentation to a user X. In step 106 a prediction of how user X will rate item i is calculated, using for example relationship (3). In step 108, the variance of the predicted user's rating is calculated, using for example relationship (7). In step 110, the predicted rating and variance are compared with predetermined threshold values. These threshold values may be set by the system or by the user X. If the rating and variance are within the thresholds, the rating and variance is provided to the user in step 114. If not, they are not provided to the user in step 112.

In an alternative embodiment of the invention, after the variance is calculated in step 108, a probability distribution is sampled in step 120. The probability distribution treats the variance as noise. Similarly, in step 122, if the sampled values are within either user set thresholds or a system set threshold, the rating and variance are presented to the user. If not, they are not presented in step 124.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A collaborative filtering system for predicting a user's rating for an item, comprising:
    a memory storing:
        a set of correlation coefficients, wherein each correlation coefficient is a measure of similarity in ratings between pairs of users in the system who have rated a particular item; and
        ratings for the item made by other users in the system; and
    a processor, responsive to a request for a predicted user's rating for the item, for calculating the predicted user's rating, wherein predicted user's rating is the sum of the product of a rating and its respective correlation coefficient divided by the sum of the correlation coefficients, and for calculating the variance of the predicted user's rating, wherein the variance of the predicted user's rating is a function of the variance of the correlation coefficients and the variance of the ratings.

2. The system of claim 1, wherein the processor calculates the predicted user's rating of an item i for a user X, $P^i_x$ in accordance with the relationship:

$$P^i_x = P_0 + \frac{\sum_{y \in raters} (S^i_y - P_0) \alpha_{xy}}{\sum_y |\alpha_{xy}|},$$

where $S^i_y$ is the rating of each user Y who has rated the item i, $P_0$ is a predetermined value and $\alpha_{xy}$ is the correlation coefficient between the user X and user Y.

3. The system of claim 2, wherein the processor calculates the variance of the predicted user's rating, $Var(P^i_x)$, in accordance with the relationship:

$$Var(P^i_x) = \sum_y \left(\frac{\partial P^i_x}{\partial \alpha_{xy}}\right)^2 Var(\alpha_{xy}) + \sum_y \left(\frac{\partial P^i_x}{\partial S^i_y}\right)^2 Var(S^i_y).$$

4. The system of claim 2, wherein the processor calculates the variance of the predicted user's rating, $Var(P^i_x)$, in accordance with the relationship:

$$Var(P^i_x) = \frac{\sum_y K^2_y / N_{xy}}{(\sum_y |\alpha_{xy}|)^2} + \frac{\sum_y \sigma^2_{xy} \sigma^2_y}{\sum_y |\alpha_{xy}|^2},$$

where the range of ratings varies from 0 to $2S_A$, $K_y = (S^i_y - S_A) - sign(\alpha_{xy}) \times (P^i_x - S_A)$ and is bounded by $[6S_A, 2S_A]$.

5. The system of claim 4, wherein the processor provides the predicted user's rating when the predicted user's rating calculation exceeds a predetermined threshold value and provides the variance as a range about the predicted user's rating.

6. The system of claim 1, wherein the processor, responsive to a user set threshold rating value, provides the predicted user rating and variance to the user when the predicted user rating is greater than the threshold rating value.

7. The system of claim 1, wherein the processor ranks and presents items to the user by estimating the distribution of the prediction rating as a normal distribution with expected value given by the calculated predicted user's rating and variance by the calculated variance of the predicted user's rating.

8. The system of claim 1, wherein the processor ranks and presents items to the user by estimating the distribution of the prediction rating from empirically determined usage data and using the observed distribution with expected value given by the calculated predicted user's rating and variance by the calculated variance of the predicted user's rating.

9. The system of claim 1, wherein the processor ranks and presents items to the user by sampling the probability distribution of the predicted user's rating and presents the predicted user's rating when the probability distribution is greater than a user set threshold value.

10. The system of claim 9, wherein the probability that the predicted score is greater than the user set threshold value $r_0$ is given by the probability that the expected user's predicted rating is greater than $r_0$:

$$\rho(P^i_x) = \frac{1}{2}\left\{1 + erf\left[\frac{P^i_x - r_0}{\sqrt{2}\,\sigma}\right]\right\}.$$

11. The system of claim 1, wherein the set of correlation coefficients comprises a set of initial correlation coefficients $\alpha_{xy}(0)$, wherein each initial correlation coefficient is an assumed measure of similarity between pairs of users in the system; and wherein the processor, responsive to a rating for an item, uses the received rating to update the user's correlation coefficients with the other users.

12. A method of predicting a user's rating for an item in a collaborative filtering system, comprising:
    providing a set of correlation coefficients, wherein each correlation coefficient is a measure of the similarity in ratings between pairs of users who have rated a particular item;
    providing ratings for the item made by other users in the system;

calculating a predicted user rating for the item, wherein the predicted rating comprises the sum of the product of a rating and its respective correlation coefficient divided by the sum of the correlation coefficients; and calculating a variance of the predicted rating, wherein the variance of the predicted rating is a function of the variance of the correlation coefficients and the variance of the ratings.

13. The method of claim 12, wherein the predicted user's rating of an item i for a user X, $P^i_x$, is calculated in accordance with the relationship:

$$P^i_x = P_0 + \frac{\sum_{y \in raters}(S^i_y - P_0)\alpha_{xy}}{\sum_y |\alpha_{xy}|},$$

where $S^i_y$ is the rating of each user Y who has rated the item i, $P_0$ is a predetermined value and $\alpha_{xy}$ is the correlation coefficient between the user X and user Y.

14. The method of claim 13, wherein the variance of the predicted user's rating, $Var(P^i_x)$, is calculated in accordance with the relationship:

$$Var(P^i_x) = \sum_y \left(\frac{\partial P^i_x}{\partial \alpha_{xy}}\right)^2 Var(\alpha_{xy}) + \sum_y \left(\frac{\partial P^i_x}{\partial S^i_y}\right)^2 Var(S^i_y).$$

15. The method of claim 13, wherein the variance of the predicted user's rating, $Var(P^i_x)$, is calculated in accordance with the relationship:

$$Var(P^i_x) = \frac{\sum_y K_y^2/N_{xy}}{(\sum_y |\alpha_{xy}|)^2} + \frac{\sum_y \sigma_{xy}^2 \sigma_y^2}{\sum_y |\alpha_{xy}|^2},$$

where the range of ratings varies from 0 to $2S_A$, $K_y=(S_y^i-S_A)-\text{sign}(\alpha_{xy})\times(P_x^i-S_A)$ and is bounded by $[6S_A, 2S_A]$.

16. The method of claim 15, further comprising:
providing the predicted user's rating when the predicted user's rating calculation exceeds a predetermined threshold value; and
providing the variance as a range about the predicted user's rating.

17. The method of claim 12, further comprising:
providing a user set threshold rating value; and
providing the predicted user rating and variance to the user when the predicted user rating is greater than the threshold rating value.

18. The method of claim 12, further comprising:
providing a set of initial correlation coefficients $\alpha_{xy}(0)$, wherein each initial correlation coefficient is an assumed measure of similarity between pairs of users in the system; and
responsive to receipt of a rating for an item, using the received rating to update the user's correlation coefficients with the other users.

19. A method of ranking items to be presented to a user in a collaborative filtering system, comprising:
providing a set of correlation coefficients, wherein each correlation coefficient is a measure of the similarity in ratings between pairs of users who have rated a particular item;

providing ratings for the item made by other users in the system;

calculating a predicted user rating for the item, wherein the predicted rating comprises the sum of the product of a rating and its respective correlation coefficient divided by the sum of the correlation coefficients;

calculating a variance of the predicted rating, wherein the variance of the predicted rating is a function of the variance of the correlation coefficients and the variance of the ratings;

sampling the probability distribution of the predicted user's rating; and presenting the predicted user's rating when the value sampled from the probability distribution is greater than a predetermined threshold value.

20. The method of claim 19, wherein the predicted user's rating of an item i for a user X, $P^i_x$, is calculated in accordance with the relationship:

$$P^i_x = P_0 + \frac{\sum_{y \in raters}(S^i_y - P_0)\alpha_{xy}}{\sum_y |\alpha_{xy}|},$$

where $S^i_y$ is the rating of each user Y who has rated the item i, $P_0$ is a predetermined value and $\alpha_{xy}$ is the correlation coefficient between the user X and user Y.

21. The method of claim 20, wherein the variance of the predicted user's rating, $Var(P^i_x)$, is calculated in accordance with the relationship:

$$Var(P^i_x) = \sum_y \left(\frac{\partial P^i_x}{\partial \alpha_{xy}}\right)^2 Var(\alpha_{xy}) + \sum_y \left(\frac{\partial P^i_x}{\partial S^i_y}\right)^2 Var(S^i_y).$$

22. The method of claim 20, wherein the variance of the predicted user's rating, $Var(P^i_x)$, is calculated in accordance with the relationship:

$$Var(P^i_x) = \frac{\sum_y K_y^2/N_{xy}}{(\sum_y |\alpha_{xy}|)^2} + \frac{\sum_y \sigma_{xy}^2 \sigma_y^2}{\sum_y |\alpha_{xy}|^2},$$

where the range of ratings varies from 0 to $2S_A$, $K_y=(S_y^i-S_A)-\text{sign}(\alpha_{xy})\times(P_x^i-S_A)$ and is bounded by $[6S_A, 2S_A]$.

23. The method of claim 19, wherein the probability that the predicted score is greater than a user set threshold value $r_0$ is given by the probability that the expected predicted user's rating is greater than $r_0$:

$$\rho(P^i_x) = \frac{1}{2}\left\{1 + \text{erf}\left[\frac{P^i_x - r_0}{\sqrt{2}\,\sigma}\right]\right\}.$$

* * * * *